United States Patent [19]

Niedospial et al.

[11] Patent Number: 4,903,286

[45] Date of Patent: Feb. 20, 1990

[54] COVER LATCH MECHANISM FOR A PHOTOGRAPHIC CASSETTE

[75] Inventors: John J. Niedospial; Bruce R. Muller; Roger G. Covington; Evan P. Carmichael, all of Rochester, N.Y.

[73] Assignee: Eastman Kodak Company, Rochester, N.Y.

[21] Appl. No.: 125,314

[22] Filed: Nov. 25, 1987

[51] Int. Cl.$^4$ .............................................. G03B 42/04
[52] U.S. Cl. ..................................... 378/182; 378/187; 378/188
[58] Field of Search ....................... 378/182, 187, 188; 200/50 C; 354/275, 281, 278

[56] References Cited

U.S. PATENT DOCUMENTS

| 3,499,147 | 3/1970 | Goodman et al. | 378/182 |
| 4,429,412 | 1/1984 | Pierce et al. | 378/182 |
| 4,514,601 | 4/1985 | Buchanan | 200/50 C |
| 4,944,484 | 4/1984 | Best et al. | 378/182 |

Primary Examiner—Carolyn E. Fields
Assistant Examiner—David P. Porta
Attorney, Agent, or Firm—James A. Smith

[57] ABSTRACT

A cover latch mechanism is disclosed for a photographic cassette, such as an x-ray film sheet cassette. Such cassettes typically have side walls, end walls and opposing front and rear cover walls in which one of the cover walls is rigidly secured to the end walls and side walls. The other cover wall is slidably moved along grooves in the side walls from a normally closed position to an open position for allowing easy access to the inside of the cassette for cleaning and maintenance. A latch mechanism is disclosed for releasably latching the other cover wall in its normally closed position.

4 Claims, 2 Drawing Sheets

COVER LATCH MECHANISM FOR A PHOTOGRAPHIC CASSETTE

BACKGROUND OF THE INVENTION

1. Field of the Invention

The present invention relates generally to photographic cassettes, and more particularly to a cover latch mechanism for an x-ray film sheet cassette for allowing easy access to the inside of the cassette for cleaning and maintenance.

2. Description of the Prior Art

The cover latch mechanism of this invention is incorporated in an x-ray film sheet cassette of the type disclosed in U.S. Pat. No. 4,444,484. Such a cassette typically has a rectangular solid configuration defined by six orthogonally joined walls which enclose a chamber for accommodating an x-ray film sheet. In one of those walls is a light shielded slot through which a film sheet can pass into and out of the chamber. Within the chamber, in alignment with the slot, is a pair of opposing planar screen surfaces relatively moveable toward and away from each other to prevent and permit, respectively, movement of the film sheet therebetween. One of those surfaces is forced by a spring assembly toward the other to clamp a film sheet therebetween. Means are provided for urging the two surfaces apart in response to placing the cassette into operative relationship with suitably configured film supplying or film processing apparatus, thereby allowing a film sheet to slide between those surfaces when the cassette is positioned for loading or unloading. When so positioned, the cassette is intended to be loaded or unloaded by the simple expedient of letting a film sheet drop into or out of the chamber by force of gravity.

In a prior art end loading x-ray film sheet cassette of the type described, two of the walls thereof comprise opposing front and rear cover walls joined to a pair of end walls and a pair of side walls. While the front cover wall is normally fixed to the end walls and side walls, the rear cover wall is normally slidably moved along grooves in the side walls and into a groove in the opposite end wall into a closed position. The rear cover wall is normally secured in the closed position to the side and end walls by one or more small screws which pass through openings in the rear cover wall and screw into complementary tapped openings in bosses in the side and end walls. Accordingly, to remove the rear cover for allowing access to the inside of the cassette for cleaning and maintenance, it is necessary to obtain a screwdriver of the proper size and type, to unscrew all of the screws, and to slidably remove the cover. Following the cleaning and/or maintenance operation, it is necessary to slidably return the cover to its closed position and to relocate and replace the screws.

Some of the manufacturing problems presented by the prior known means for releasably securing a rear cover wall to the cassette involve designing and precisely positioning tapped openings in the cassette walls, and precisely drilling openings in the rear cover wall in register with the tapped openings. Other problems are that the removal and replacement of the rear cover wall is time consuming, a specialized screwdriver is needed which is not always readily available, and a high risk exists of losing one or more of the small screws. The aforementioned problems are solved by the cover latch mechanism of this invention.

SUMMARY OF THE INVENTION

An object of the present invention is to provide a cover latch mechanism for an x-ray cassette of the type having one end wall with a slot therein through which a sheet is moveable therethrough along an inlet path, an opposite end wall, opposite side walls joining the one end wall and opposite end wall, and opposing front and rear cover walls joined to the end walls and side walls in which one of the cover walls is slidably moveable along grooves in the side walls and into a recess in the opposite end wall into a closed position. The cover latch mechanism for releasably latching the one cover wall in its closed position comprises:

an opening in the one cover wall adjacent the opposite end wall when the one cover wall is in its closed position;

a button on the opposite end wall interposed between the front and rear cover walls in alignment with the opening; and a spring coupled to the button for biasing the button into engagement with the opening for releasably latching the one cover wall in its closed position.

A more specific object of the invention is to provide a cover latch mechanism for an x-ray cassette having a channel-shaped end wall having a base and spaced apart inner and outer plates. The one cover wall has side edges which are slidably moved along grooves in the side walls until the leading end of the cover wall slides into a recess in the outer plate in the closed position of the cover. The cover latch mechanism comprises a post on the base extending upwardly between the inner and outer plates toward and perpendicular to the one cover wall. The button has a blind cavity at one end for receiving the post, and further has a head at the opposite end. A spring is captive within the blind cavity and encircles the post for biasing the button head into the opening in the one cover wall for releasably latching the one cover wall to the end and side walls.

Still another object of the invention is to provide the cover latch mechanism with light lock means comprising a ring encircling the cover wall opening and a groove encircling the ring, and a recess on the button encircling the head and a rim encircling the recess whereby the ring nests within the recess and the rim nests within the groove in light-tight relation when the head is forced into the opening under the bias of the spring.

The invention, and its objects and advantages, will become more apparent from the detailed description of a preferred embodiment presented below.

BRIEF DESCRIPTION OF THE DRAWINGS

In the detailed description of a preferred embodiment of the invention presented below, reference is made to the accompanying drawings, in which.

DESCRIPTION OF A PREFERRED EMBODIMENT

Because certain parts of photographic cassettes and related apparatus are well known, the following description is directed in particular to those elements forming, cooperating directly with, or relating to the present invention. The elements not specifically shown or described herein are selectable from those known in the art, particularly as shown in U.S. Pat. No. 4,444,484.

Figure 1:
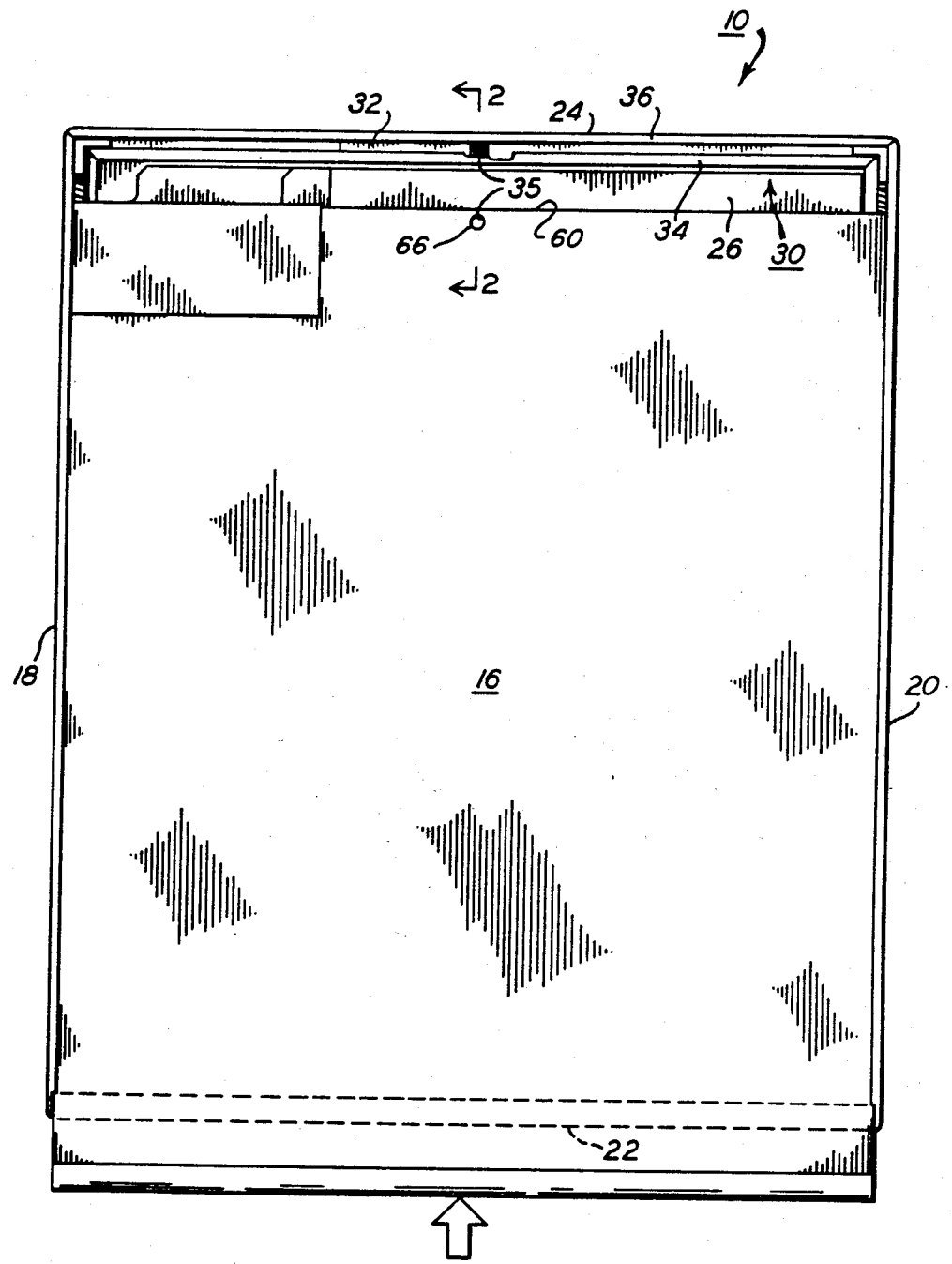
FIG. 1 is a top plan view of an x-ray cassette in which the rear cover wall is partially open showing a preferred embodiment of the cover latch mechanism of this invention.

Illustrated in FIG. 1 is a photographic cassette 10 designed to hold a film sheet for exposure when positioned in operative relation to a source of x-ray radiation. The cassette 10 includes a rectangular-solid-shaped housing defined by six opaque walls 14, 16, 18, 20, 22 and 24 which are joined as shown to enclose a chamber 26 for accommodating the film sheet. Opposing front and rear cover walls 14, 16 (FIG. 2) are spaced from and parallel with each other so that when the cassette is oriented for an exposure, front or tube cover wall 14 faces the radiation source and rear cover wall 16 lies behind the film sheet. Joined to front and rear cover walls 14, 16 are opposing side walls 18, 20 and opposing end walls 22, 24. End wall 22 has a light-shielded elongate opening or slot therein, not shown, through which the film sheet can pass along a film path into and out of chamber 26. End wall 24 (FIG. 2) comprises a channel member 30 having a base 32 and spaced-apart inner and outer plates 34, 36 respectively extending upwardly from the base toward rear cover wall 16.

Figure 2:
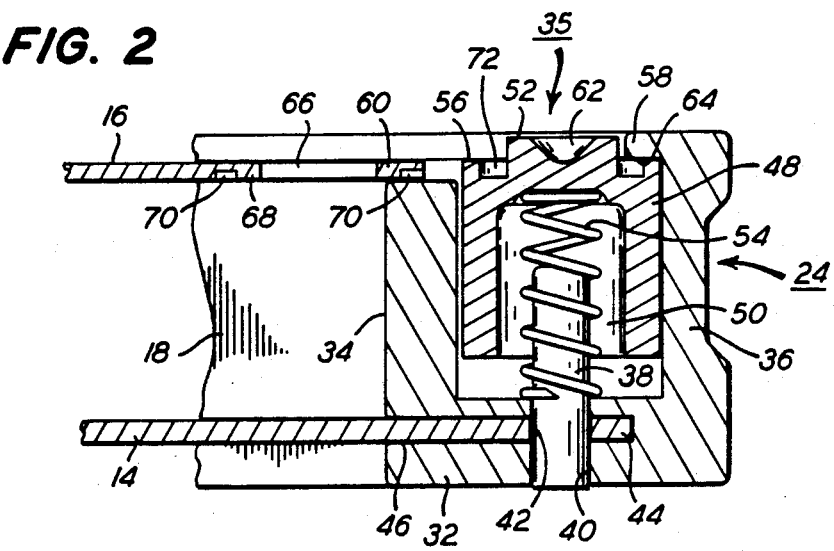
FIG. 2 is a segmental enlarged view in section taken substantially along line 2—2 of FIG. 1.
Figure 3:
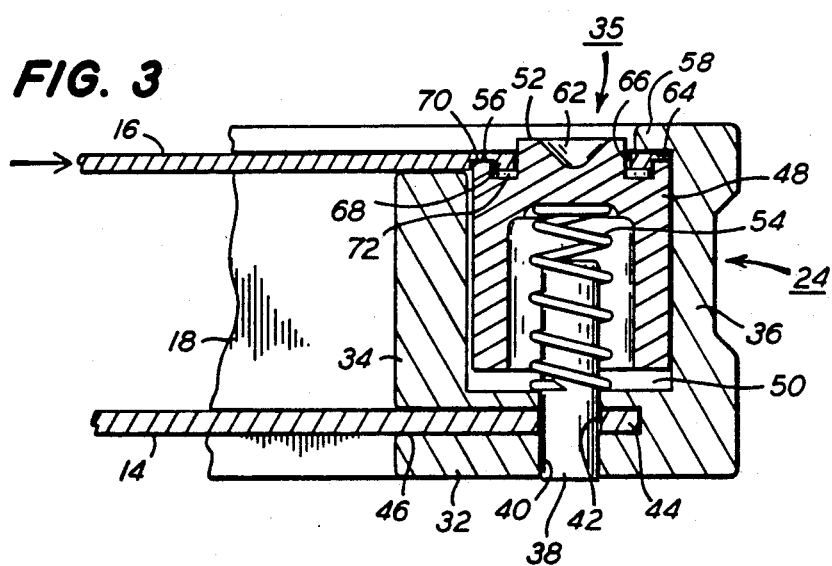
FIG. 3 is a view similar to FIG. 2 showing the rear cover wall in a closed and latched position.
Figure 4:
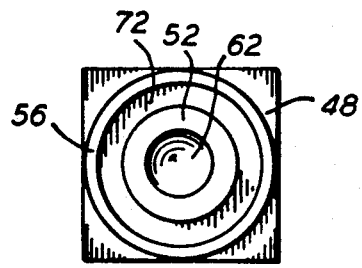
FIG. 4 is a top plan view of the cover latch button.

With reference to FIGS. 2-4, a cover latch mechanism 35 for releasably latching rear cover wall 16 to side walls 18, 20 and end walls 22, 24 will now be described. The cover latch mechanism comprises a post 38 extending through an opening 40 in base 32 and a registering opening 42 in an end portion 44 of front cover wall 14 which nests within a groove 46 in the base. The post 38 is secured to base 32 and end portion 44 by a press fit and extends upwardly between plates 34, 36 toward and perpendicular to rear cover wall 16. A unitary square-shaped button 48 having a blind cavity 50 at one end and a head 52 at the opposite end is loosely mounted in the channel between plates 34, 36. A helical spring 54 is held captive within blind cavity 50 and encircles post 38 with one end thereof bearing against base 32 and the opposite end thereof bearing against the blind end of cavity 50 forcing button 48 upwardly until a rim 56 encircling head 52 engages a laterally extending lip 58 on outer plate 36 when rear cover wall 16 is in an open position, as seen in FIG. 2.

To releasably latch rear cover wall 16 to the side walls 18, 20 and end walls 22, 24 in its closed position, the rear cover wall is slidably moved along grooves, not shown, in the side walls until a leading end portion 60 thereof engages button 48. A recess 62 in head 52 of button 48 is engaged by an instrument, such as a pencil or the like, and the button is depressed against the bias of spring 54 allowing leading end portion 60 of rear cover wall 16 to move across the free end of inner plate 34 and into a recess 64 under lip 58 of outer plate 36. In this position, head 52 aligns with an opening 66 in leading end portion 60 and is pressed upwardly into the opening by spring 54, as seen in FIG. 3, to releasably latch rear cover wall 16 to the side and end walls. Because of the loose fit of button 48 between inner and outer plates 34, 36, slight pivotable movement of the button by the instrument causes head 52 to accurately align itself with opening 66 and to move therein if the alignment is not exactly perfect.

A light lock means is interposed between the opposite end of button 48 and rear cover wall 16 in its closed position to prevent light from entering opening 66. The light lock means comprises a ring 68 and groove 70 encircling opening 66 which engages or nests with a complementary recess 72 and rim 56 encircling button head 52, as seen in FIG. 3.

The invention has been described in detail with particular reference to a preferred embodiment thereof, but it will be understood that variations and modifications can be effected within the spirit and scope of the invention.

What is claimed is:

1. In an x-ray cassette having one end wall with a slot therein through which a sheet is movable therethrough along an inlet path, an opposite end wall, opposite side walls joining the one end wall and opposite end wall, and opposing front and rear cover walls joined to the end walls and side walls in which one of the cover walls is slidably moved along grooves in the side walls and into a recess in the opposite end wall into a closed position, the x-ray cassette further having a cover latch mechanism for releasably latching the one cover wall in its closed position comprising:
    an opening in the one cover wall adjacent the opposite end wall;
    a button interposed between the front and rear cover walls in alignment with the opening; and
    a spring coupled to the button for biasing the button into engagement with the opening for releasably latching the one cover wall in its closed position, the button further having a blind cavity at one end for receiving the spring, and a head at the opposite end that is biased into the opening, the cassette further comprising a post mounted on the other cover wall adjacent the opposite end wall, the post extending toward the one cover wall and being encircled by the spring which is captive within one blind cavity, and light-lock means interposed between the opposite end of the button and the one cover wall in its closed position to prevent light from entering the opening, the light-lock means further comprising a ring and groove encircling the opening, and a recess and rim on the button encircling the head and nesting within the ring and groove respectively under the bias of the spring.

2. In an x-ray cassette having one end wall with a slot therein through which a sheet is movable therethrough along an inlet path, an opposite channel-shaped end wall having a base and spaced-apart inner and outer upstanding plates perpendicular to the inlet path, opposite side walls joining the one end wall and opposite end wall, and opposing front and rear cover walls joined to the end walls and side walls in which one of the cover walls is slidably moved along grooves in the side walls and across a free end of the inner plate and into a recess in the outer plate into a closed position, the x-ray cassette further having a cover latch mechanism for releasably latching the one cover wall in a closed position comprising:
    a post on the base extending upwardly between the inner and outer plates toward and perpendicular to the one cover wall;
    an opening in the one cover wall adjacent the outer plate of the opposite end wall;

a button having a blind cavity at one end of receiving the post and having a head at the opposite end, the button further having outer surfaces that loosely fit within facing surfaces of the inner and outer plates for allowing limited pivotal movement of the button between the plates as well as a lateral pivotal movement of the button in the direction of the channel; and a spring captive within the blind cavity and encircling the post, the spring having one end engaging the base and its opposite end engaging the blind end of the cavity for biasing the head into the opening in the one cover wall for releasably latching the one cover wall in its closed position.

3. A cover latch mechanism for an x-ray cassette according to claim 2 wherein light lock means are interposed between the opposite end of the button and the one cover plate in its closed position to prevent light from entering the opening.

4. A cover latch mechanism for an x-ray cassette according to claim 3 wherein the light lock means comprises a ring and groove encircling the opening, and a complementary recess and rim on the button encircling the head which nests with the ring and groove respectively under the bias of the spring.

* * * * *